Patented Sept. 24, 1940

2,215,596

UNITED STATES PATENT OFFICE 2,215,596

PROCESS OF PREPARING RESINOUS COMPOSITIONS

Fritz Seebach, Erkner, near Berlin, Germany, assignor, by mesne assignments, to Union Carbide and Carbon Corporation, New York, N. Y., a corporation of New York No Drawing. Application January 23, 1936, Serial No. 60,518. In Germany January 24, 1935

8 Claims. (Cl. 260—38)

In the preparation of synthetic resins from aqueous formaldehyde solutions and phenols, for example, the procedure followed as a rule is that after the separation of the resin from the aqueous reaction medium the water and volatile uncombined starting materials or reaction by-products are removed by distillation requiring time, labor and expense. Great weight has been placed on the removal of water by a distillation step for obtaining water-free and "spring-hard" resins. These are in contrast to softer products, readily crushed, and in the crushed form are mixed with fillers or the like or otherwise utilized.

It has now been found that in the preparation of synthetic resins from aqueous formaldehyde, the distillation of water from the reaction mass is not required, and useful products are obtained readily and advantageously by proceeding in accordance with the present invention as hereinafter disclosed. The invention comprises causing the condensation with aqueous formaldehyde in a closed vessel until the resin-forming reaction is so far advanced that the water is distributed in the resin whereupon the water-containing resin is employed in the usual manner but without removal of water.

Example 1.—To prepare a novolak, 1000 parts by weight of commercial cresol, 550 parts by weight of an aqueous formaldehyde solution 40% with an addition of a suitable catalyst, as for example ammonium chloride, phthalic acid or other catalyst, are heated for 20 minutes at 130° C. under stirring in the autoclave, using for example approximately 3 atmospheres pressure. After this period the resin formation is completed and the water is evenly distributed in the resin. The resin is then permitted to flow out or is forced out of the apparatus without any previous subjection to distillation. The resin holds the water in finely distributed form and it shows a porcelain-like appearance caused by the presence of water. It feels dry and can be operated upon at room temperature in exactly the same manner as a resin which has been freed from water by evaporation. The water remaining in the resin, varying in quantity between 20 and 30% according to its preparation, disappears upon further treatment, as for example with fillers, hardening agent, and the other usual additions on heated rolls readily and quickly without causing any disturbance. The blending of the resins with fillers on heated rolls therefore proceeds exactly as if dehydrated resins were used. Apparently the water has in this operation a plasticizing effect and assists in the process of mixing the resin with the other ingredients. Articles molded from the compositions so obtained do not compare unfavorably in appearance or quality with other molded articles prepared from a dehydrated resin; on the contrary, they not only can be made to equal these characteristics of the latter but even to excel them.

The process described is not limited to a definite cresol; any phenol or cresol can be used for example, and also cresol mixtures that react more or less slowly or quickly in accordance with their composition. For example, a cresol rich in o-cresol can be used, and in that case either the reaction period is prolonged or a greater amount of or a stronger catalyst is added. Also a cresol can be used from which components preventing or delaying reaction have been removed entirely or in part; in this case a shorter reaction period or a weaker catalyst is employed. Phenol and cresol mixtures of ordinary composition can also be made the basis for the process. Care should be taken to obtain the fine distribution of water in the resin, which is recognized by the porcelain-like appearance. This condition is readily obtained during the condensation, if the reaction mixture is heated sufficiently long at increased pressure under stirring.

Accordingly the invention lends itself in the first place to the production of phenol-formaldehyde synthetic resins of novolak character. Resoles, however, can also be produced according to the present process by modifying the ratio between phenol and formaldehyde or by modifying the catalyst.

Example 2.—1000 parts by weight of commercial cresol, 650 parts by weight of an aqueous formaldehyde solution 40%, are heated with an addition of 10 grams ammonia water of 25% strength for 5 to 10 minutes in an autoclave, as in Example 1. A resol is obtained. The further treatment of the resin is in accordance with Example 1.

Example 3.—100 parts by weight of the water-containing resol as obtained according to Example 2, are dissolved in 60–75 parts of alcohol, and after adding thereto if necessary coloring materials, and/or plasticizers the solution is used as varnish.

Example 4.—3 mols of commercial cresol, 1 mol of aniline and 3 mols of formaldehyde as aqueous solution 40%, are condensed and the resin obtained is worked up, as described in Example 1.

Example 5.—1 mol of phenol ($C_6H_5OH$), 1 mol of urea and 2-3 mols of aqueous formaldehyde 40%—to which 0.5% hydrochloric acid (10%) calculated on phenol and urea—are condensed and worked up, as described in Example 1.

Other synthetic resins can also be prepared in accordance with this invention, for example, any mixed condensate of phenol, urea and formaldehyde; urea, thiourea and formaldehyde; cresol, aniline and formaldehyde; phenols, aldehydes and oils, such as wood oil, blown castor oil; etc. Instead of formaldehyde solutions, other aldehyde solutions can be used and the resin-forming reaction can also be carried out in the presence of fillers or other inert additions. Furthermore, the condensation can be started in an open vessel, suitably under reflux, and then finished in a closed vessel as described. For example the condensation is started while the autoclave is still open and the latter is closed after one third to one half of the condensation period has passed. The process of this invention can be used not only for the preparation of moulding mixtures, but also for the preparation of any other products containing synthetic resins, such as lacquers, or the like. The aqueous synthetic resins can be employed with other natural or artificial resins. For instance the resin obtained according to Example 1 or 2 may be worked in mixture with an anhydrous novolak or an anhydrous resol from phenol and formaldehyde, or, as in the manufacture of brake linings, in mixture with rosin.

By the avoidance of the distillation step after the resin formation the process according to the present invention offers the advantage that the condensation of the resins can be carried much further, since there is no necessity that the resin remain thinly liquid when hot for a distillation step. Therefore, the resins to be used in the present process may be reacted to a higher degree of condensation than obtained in the known practice, which is of advantage in the preparation of molding mixtures as well as of lacquers. Another advantage resides in the fact that the water favors the mixing of the resin with other substances, for example, on heated rolls; it renders mixing and plasticizing easier, and it always opposes premature hardening of the mass.

If diluted formaldehyde solutions, for example 30%, are used or, if it is shown in the gauge glass of the autoclave that part of the water is not occluded by the resin, then, on carrying out the process according to the present invention, a portion of the water may be drawn off, or it may be distilled off preferably under vacuum.

In carrying out my invention, besides carbolic acid and cresols, also the higher phenols as for example xylenols, dioxydiphenyl-methane and alkylated or aralkylated phenols may be used. In my present application the term "phenol" covers all such phenols or mixtures of same. The temperature of condensation is so chosen that the condensation is effected with sufficient speed. As a rule a temperature of 110–150° and not higher than 150° C. is employed. The amount of water contained in the porcelain-like condensation product depends on the content of water in the reaction mixture, and for example in the manufacture of novolaks and resols from phenol and formaldehyde it amounts to about 20–30%. However, it is also possible to obtain products containing a smaller or greater percentage of water, for example 10% or 40%. The reaction period is influenced by the nature of the components and the working conditions, in particular by the reaction temperature, and generally amounts to 15–120 minutes. According to my present invention in the condensation of phenols and formaldehyde for the purpose of obtaining a novolak, 1 mol of phenol is condensed preferably with ½–¾ mol of formaldehyde and, if resols are to be obtained, 1 mol of phenol preferably with 1 mol of formaldehyde or somewhat less, but my invention is not limited to these proportions. The novolaks are mostly worked with the usual hardening agents, for instance with paraformaldehyde, hexamethylentetramine, anhydroformaldehyde aniline etc. According to my invention the resinous components are condensed to a high degree of condensation however the resin obtained must in any case be fusible. In the resin obtained according to this invention, the water is distributed or dispersed in a finely divided state and acts as a neutral diluting agent preventing premature hardening. The water-containing resin is hard at ordinary temperature, for instance at 20–30° C., and can easily be pulverized and it melts at higher temperatures. At the reaction temperature it leaves the autoclave as a viscous mass similar to a well condensed resin substantially free from water.

What is claimed is:

1. Process of preparing a moldable composition including a synthetic resinous product of a water solution of an aldehyde and a phenol which comprises reacting the aldehyde and the phenol in proportions of one mol of the phenol to one mol or less of the aldehyde in the presence of a catalyst at a temperature of 110 to 150° C., the latter portion of the reaction at least being conducted under a pressure approximating three atmospheres to advance the resin to a stage characterized upon cooling by a solid pulverizable and fusible form and to retain the water in a distributed form throughout the product, the water content forming from approximately 10 to 40% of the mass, and blending the product as discharged from the reaction vessel without previous dehydration with a filler on heated rolls, the water content of the product acting as a plasticizer and promoting the blending of the product with the filler.

2. Process of preparing a moldable composition including a synthetic resinous product from a water solution of an aldehyde with a phenol which comprises reacting the aldehyde and the phenol at a temperature of 110 to 150° C., the latter portion of the reaction at least being conducted under a pressure approximating three atmospheres to advance the resin to a stage characterized upon cooling by a solid pulverizable and fusible form and to retain the water content in a distributed form throughout the product, the water content of said product approximating from 10 to 40%, and blending the product as discharged from the reaction vessel without previous dehydration with a filler by means of heated rolls, the water content acting as a plasticizer and promoting the blending of the product with the filler.

3. Process of preparing a synthetic resinous product from a water solution of an aldehyde and a phenol which comprises reacting the aldehyde with the phenol in proportions of one mol of the phenol to approximately one mol or less of the aldehyde, the latter portion of the reaction at least being conducted under a pressure approximating three atmospheres to advance the resin to a stage characterized upon cooling by a solid pulverizable and fusible form and to retain the water content in a distributed form throughout the product, the water content of said product approximating from 10 to 40% whereby the product is in a condition suitable for blending without dehydration with a filler to yield a moldable composition.

4. Process of preparing a synthetic resinous product from a water solution of an aldehyde and a phenol which comprises reacting the aldehyde and the phenol, the latter portion of the reaction at least being conducted under pressure to advance the resin to a stage characterized upon cooling by a solid pulverizable and fusible form and to retain the water content in a distributed form throughout the product, the water content of said product approximating from 10 to 40% whereby the product is in a condition suitable for blending without dehydration with a filler to yield a moldable composition.

5. Process of preparing a synthetic resinous product from a water solution of an aldehyde and a phenol which comprises reacting the aldehyde and the phenol in proportions of one mol of the phenol to one mol or less of the aldehyde, the latter portion of the reaction at least being conducted under pressure to advance the resin to a stage characterized upon cooling by a solid pulverizable and fusible form and to retain the water content in a distributed form throughout the product, the water content of said product approximating from 10 to 40%, and blending the product with a hardening agent whereby the product is in a condition suitable for blending without dehydration with a filler to yield a moldable composition.

6. Moldable composition comprising a filler blended on heated rolls with a pulverizable and fusible resinous reaction product of an aqueous aldehyde and phenol advanced under pressure without dehydration to a solid pulverizable condition, said product having a water content approximating from 10 to 40%.

7. Synthetic resinous product in a condition suitable for blending with a filler to yield a moldable composition comprising a condensation product of an aqueous aldehyde and a phenol advanced under pressure without dehydration to a solid pulverizable and fusible condition, said product having a water content approximating from 10 to 40%.

8. Synthetic resinous product in a condition suitable for blending with a filler to yield a moldable composition comprising a condensation product of an aqueous aldehyde and a phenol in proportions of one mol of the phenol to one mol or less of the aldehyde and advanced under pressure without dehydration to a solid pulverizable and fusible condition, said product having a water content approximating from 10 to 40%, and a heat hardening agent blended therewith.

FRITZ SEEBACH.